United States Patent
Zaky

[11] 3,900,247
[45] Aug. 19, 1975

[54] OPTICAL MODULATOR HAVING COMPENSATION FOR THERMAL AND SPACE CHARGE EFFECTS

[75] Inventor: Safwat George Zaky, Oakville, Canada

[73] Assignee: Northern Electric Company Limited, Montreal, Canada

[22] Filed: Feb. 26, 1974

[21] Appl. No.: 445,875

[52] U.S. Cl. .............................. 350/150; 350/157
[51] Int. Cl.² ........................................... G02F 1/03
[58] Field of Search ................. 350/150, 147, 157

[56] References Cited
UNITED STATES PATENTS

| | | |
|---|---|---|
| 3,356,438 | 12/1967 | Macek et al. ........................ 350/150 |
| 3,630,595 | 12/1971 | Peek .................................. 350/150 |
| 3,822,379 | 7/1974 | Brienza ........................... 350/150 X |

*Primary Examiner*—John K. Corbin
*Attorney, Agent, or Firm*—John E. Mowle

[57] ABSTRACT

An optical modulator in which a polarized light beam is reflected back through its optical modulation element after a 180° relative phase shift between the ordinary and extraordinary components of the beam, so as to nullify any modulation caused by thermal or space charge effects. To obtain modulation, the birefringence of the modulation element is changed during the finite transmission time of the modulator. Thus only the dynamic birefringence of the element causes modulation and not its static value.

2 Claims, 2 Drawing Figures

OPTICAL MODULATOR HAVING COMPENSATION FOR THERMAL AND SPACE CHARGE EFFECTS

BACKGROUND OF THE INVENTION

This invention relates to a phase or amplitude optical modulator which is substantially immune to thermal and space charge effects. The optical modulator is particularly adapted for use in optical communication systems or in optical measuring devices. It can also be used as an intra-cavity modulator in Q-switching and mode locking of laser oscillators.

In a typical optical modulator, a linearly polarized beam of light passes through an electro-optic crystal and an analyzer. The optic axis of the analyzer is perpendicular, while that of the electro-optic crystal is at 45°, relative to the incident plane of polarization of the light beam. The crystal exhibits double refraction or birefringence when subjected to a strong electric field. The relative phase retardation between the ordinary and extraordinary components of the light waves polarized orthogonal and parallel respectively to the optic axis of the electro-optic crystal, is a function of the electric field strength resulting from an applied voltage, as well as other parameters such as the temperature of the crystal and its natural birefringence. Under certain conditions, the applied voltage results in a relative phase retardation between the two components equal to zero or a multiple of $2\pi$ radians. In this case, the polarization of the light beam will not be affected by passage through the electro-optic crystal and assuming a perfect analyzer, the output beam will be completely blocked by the analyzer. When the applied voltage results in a relative phase retardation of an odd multiple of $\pi$ radians between the two components, the incident light beam will be rotated 90° and the light beam will be completely transmitted by the analyzer.

In practice, neither perfect blocking nor perfect transmission of the incident light beam could be achieved and the ratio between the maximum and minimum intensities of the transmitted light is referred to as the extinction ratio. At high modulation frequencies, the extinction ratio drops because of two main factors. Firstly, the amount of birefringence changes with the temperature of the electro-optic crystal which results from dielectric losses therein. To alleviate this problem, the temperature of the crystal must be controlled within very narrow limits. For example, in an article entitled: "Terminals for a High-Speed Optical Pulse Code Modulation Communication System: 1.224-Mbit/s Single Channel" by Richard T. Denton and Tracy S. Kinsel; Proceedings of the IEEE, Volume 56, No. 2, Feb. 1968, pps 140–145; it is stated that the temperature of a LiTaO$_3$ crystal used in an electro-optic modulator, must be controlled and uniform to ±0.025° C in order to maintain an extinction ratio of at least 0.01 (−20 dB). Secondly, the electro-optic effect is not uniform over the cross-section of the light beam. This non-uniformity is caused by many factors such as local variations of the temperature within the crystal, inhomogeniety of the crystal, and the effect of space charge distribution created by the electric field in some types of electro-optic crystals.

SUMMARY OF THE INVENTION

The present invention utilizes phase cancellation to substantially eliminate these effects and relies on the transit time required for the light beam to pass through the modulator to provide the necessary modulation.

Thus, in accordance with the present invention there is provided an optical modulator comprising the tandem connected optical combination of a beam splitter for splitting light which is reentrant from that which is incident from a polarized light source; a quarter-wave plate and a mirror which in combination reflect the incident light and introduce a 180° relative phase shift of the components of the light beam; and a variable birefringent device located between the beam splitter and the quarter-wave plate for varying the relative phase of the ordinary and extraordinary components of the polarized light being transmitted through it. The total optical transmission time from the variable birefringent device through the quarter-wave plate to the mirror and back again is at least as great as the time required to change the birefringence of the device.

As a result, the net relative phase shift of the ordinary and extraordinary components of the polarized light in the modulator is substantially a result of only the change in birefringence of the device. Consequently, substantially complete compensation for temperature and space charge effects is achieved providing the natural birefringence of the device remains constant over the period of time taken for the light beam to travel from the device through the plate to the mirror and back.

In a particular embodiment, the optic axis of the device is oriented at an angle of $\pi/4$ radians with respect to that of the source and the quarter-wave plate. In still another embodiment, the device is an electro-optic crystal and the beam splitter is a polarization separator having its incident optic axis parallel to that of a linearly polarized source, so that only the component of the reentrant light which is orthogonal to the incident light emerges thereby providing amplitude modulated light at the output of the optical modulator.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
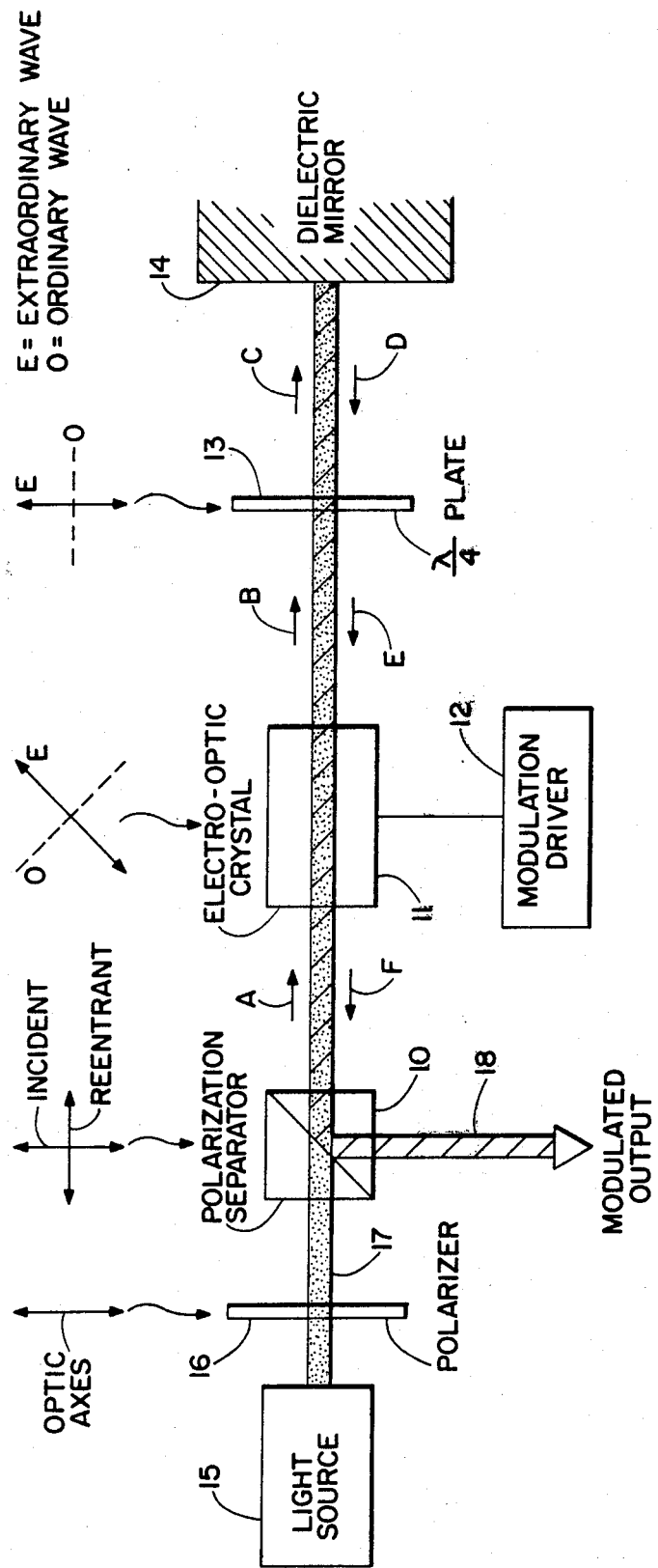
FIG. 1 is a pictorial diagram of an optical modulator in accordance with the present invention.

Referring to FIG. 1, the optical modulator comprises the tandem connected optical combination of a polarization separator 10 (which functions as a beam splitter), the output of which is coupled to an electro-optic crystal 11 (which functions as a variable birefringent device when driven by a modulation driver 12). The output of the crystal 11 passes through a quarter-wave plate 13 to a totally reflecting dielectric mirror 14. During operation, the optical modulator is connected to a source of polarized light which consists of a light source 15 the output of which is fed through a polarizer 16. As shown in FIG. 1, the orientation of the optic axis of the electro-optic crystal 11 is at 45° with respect to that of the polarizer 16 and the quarter-wave plate 13. The incident optic axis of the polarization separator 10 is parallel to that of the polarizer 16, while its reentrant optical axis is orthogonal to that of the polarizer 16. The location of each of the vector diagrams illustrated in FIG. 2 is designated by a corresponding reference character in FIG. 1.

In operation of the optical modulator, a beam of light from the source 15 is fed through the polarizer 16 to derive a vertically polarized light beam 17. The incident light beam 17 passes through the polarization separator 10, followed by the electro-optic crystal 11, the quarter-wave plate 13 and the dielectric mirror 14. The beam 17 reflected by the mirror 14 passes back through the quarter-wave plate 13, the electro-optic crystal 11, and then reenters the polarization separator 10. Components of the reentrant beam which are horizontally polarized are reflected downward and emerge as a modulated output light beam 18, while vertically oriented components are transmitted back towards the source 15.

Figure 2:
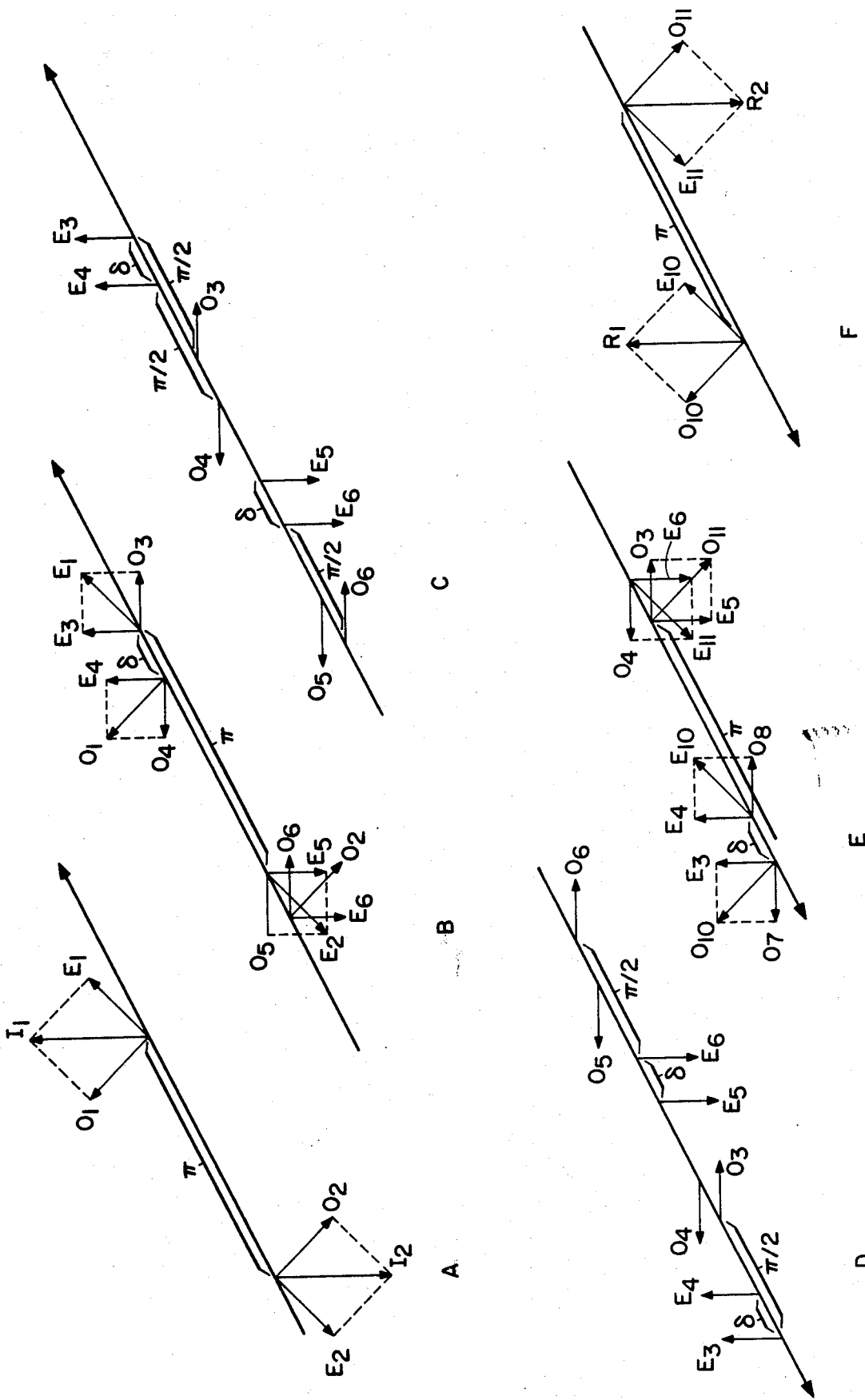
FIG. 2 is a series of light vectors vs time at various intervals throughout the optical modulator illustrated in FIG. 1.

As illustrated in diagram A of FIG. 2, linearly polarized vertically oriented light from the polarizer 16 passes through the polarization separator 10 and is shown as incident vectors $I_1$ and $I_2$ separated by a phase delay of $\pi$ radians. Vectors $I_1$ and $I_2$ can be resolved into vectors $O_1$, $E_1$ and $O_2$, $E_2$ which are parallel to the axis of the crystal 11. If at a given instant of time a particular voltage is applied from the modulation driver 12 to the electro-optic crystal 11, the ordinary rays $O_1$ and $O_2$ will emerge from the crystal 11 with a phase delay $\delta$ with respect to the extraordinary rays $E_1$ and $E_2$ respectively as shown in diagram B of FIG. 2. The ordinary $O_3$, $O_4$, $O_5$ and $O_6$ and extraordinary $E_3$, $E_4$, $E_5$ and $E_6$ components of these rays are incident upon the quarter-wave plate 13 and the former emerge therefrom with an additional phase delay of $\pi/2$ radians with respect to the latter, as shown in diagram C of FIG. 2. After being reflected from the dielectric mirror 14, the various components $O_3$, $O_4$, $O_5$, $O_6$, $E_3$, $E_4$, $E_5$ and $E_6$ assume the phase relationship shown in diagram D of FIG. 2. Upon again passing through the quarter-wave plate 13 an additional phase delay of $\pi/2$ radians is encountered so that the components $O_3$ and $O_4$ are now in phase with the components $E_5$ and $E_6$ respectively. Vector components $O_7$ and $O_8$ have also been delayed by $\pi$ radians such that they are now in phase with vector components $E_3$ and $E_4$ respectively. These various vectors can be resolved into vectors $O_{10}$, $O_{11}$, $E_{10}$ and $E_{11}$ which again have a phase delay of $\delta$ radians between them as shown in diagram E of FIG. 2. It will be noted however that these vectors are 180° out-of-phase with those shown in diagram B and are travelling in the opposite direction.

Assuming no change in the birefringence of the electro-optic crystal 11, the vectors $O_{10}$ and $O_{11}$ will again encounter a delay $\delta$ upon repassing through the crystal 11 and consequently emerge in-phase with the vectors $E_{10}$, $E_{11}$ respectively as shown in diagram F of FIG. 2. These vectors can then be resolved into vertically polarized resultant vectors $R_1$ and $R_2$. The net effect of the combination of the electro-optic crystal 11, the quarter-wave plate 13 and the mirror 14 is equivalent to a half-wave plate oriented with its optic axis parallel to the optic axis of the quarter-wave plate 13. This effect is completely independent of the phase delay $\delta$ introduced by the electro-optic crystal 11 whether this retardation is due to natural or induced birefringence.

To obtain modulation of the light beam 17, the optical modulator utilizes the finite time taken to travel from the electro-optic crystal 11 to the mirror 14 and back. Thus, if during the time interval taken for the light waves to travel between diagrams B and E, the voltage applied to the electro-optic crystal 11 from the modulation driver 12 is changed, the phase delay $\delta$ on the return pass through the crystal 11 will be different from that during the original pass. Consequently, the vectors $O_{10}$ and $O_{11}$ will no longer be in-phase with the vectors $E_{10}$ and $E_{11}$ as shown in diagram F and the resultant vectors $R_1$ and $R_2$ will no longer be vertically oriented. Upon reentering the polarization separator 10, the horizontal component of the resultant vectors $R_1$ and $R_2$ will be reflected downward so as to derive an amplitide modulated light beam 18 while the vertical component will be transmitted back towards the source 15. In the above, it is assumed that the time required for the light beam 17 to travel through the electro-optic crystal 11 is negligible compared to the time required to pass from the crystal 11 to the mirror 14 and back again. However, it is understood that the technique is still applicable to situations where the above condition does not apply.

It will be evident from FIG. 2 that the net phase modulation of the resultant light beam 18 is caused only by the change in birefringence of the electro-optic crystal 11 during the time required for the beam to travel from the crystal 11 to the mirror 14 and back again. Any changes in birefringence that occur over periods of time longer than that will not contribute to the net phase retardation of the reflected beam 18. For practical distances between the electro-optic crystal 11 and the mirror 14, this time interval is much smaller than the time constants associated with thermal and space charge effects within the electro-optic crystal 11. Consequently, the thermal and space charge effects are substantially compensated and will have no net contribution to the phase retardation of the output beam 18. In a typical arrangement, the maximum time required to change the birefringence of the crystal 11 by the modulation driver 12 is 10 nanoseconds and the distance between the crystal 11 and the mirror 14 is 1.5 meters.

It will be evident that other forms of variable birefringence devices such as magneto-optic cells can be substituted for the electro-optic crystal 11. In addition, the polarization separator 10 reflects only the horizontal component of the reflected light beam 18. By substituting a non-polarizing beam splitter such as a partially reflective mirror, the output beam 18 will be phase modulated rather than amplitude modulated. If when utilizing the polarization separator 10, the change in voltage applied to the electro-optic crystal 11 is sufficient to cause a 90° phase shift of the reflected beam 18 with respect to the incident beam 17, pulse modulation will be obtained. Also, the invention is not limited to linearly polarized light nor must the axes of the various components be oriented as illustrated in the preferred embodiment of FIG. 1. These configurations will result in various forms of elliptical polarization as is well known in the art.

It is also understood that the combination of the quarter-wave plate 13 and the mirror 14 could be replaced by other optical components which will provide the necessary phase shift and introduce time delay to reduce the physical size of the modulator.

What is claimed is:

1. In an optical modulator for connection to a source of linearly polarized light, comprising in tandem connected optical combination;
- a beam splitter for splitting the linearly polarized light which is reentrant from that which is incident thereupon;
- a mirror; and
- a variable birefringent device located between the beam splitter and the mirror;

the improvement comprising:
- a quarter-wave plate located between the variable birefringent device and the mirror;
- the optical axis of the birefringent device being at an angle of $\pi/4$ radians with respect to that of the source of linearly polarized light and the quarter-wave plate, and the total optical transmission time from the variable birefringent device through the quarter-wave plate to the mirror and back again being at least as great as the time required to change the birefringence of said device;
- whereby the relative phase shift, of the ordinary and extraordinary components of the polarized light in said modulator is substantially a result of only said change in birefringence of said device.

2. An optical modulator as defined in claim 1 in which the variable birefringent device is an electro-optic crystal, and in which the beam splitter is a polarization separator having its incident optical axis parallel to that of said source, so that only the component of the reentrant light which is orthogonal to the incident light emerges at its output, thereby providing amplitude modulated light at the output of the optical modulator.

* * * * *